US006963536B1

(12) United States Patent
Tzeng et al.

(10) Patent No.: US 6,963,536 B1
(45) Date of Patent: Nov. 8, 2005

(54) ADMISSION CONTROL IN A NETWORK DEVICE

(75) Inventors: Shr-Jie Tzeng, Fremont, CA (US); Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 917 days.

(21) Appl. No.: 09/814,816

(22) Filed: Mar. 23, 2001

(51) Int. Cl.[7] .................. G01R 31/08; G06F 11/00; G08C 15/00; H04J 1/16; H04L 1/00
(52) U.S. Cl. .................. 370/230; 370/235; 370/229
(58) Field of Search ................. 370/230, 231, 370/233, 235, 389, 398, 351, 468, 232, 234, 370/230.1, 395.1, 397, 395.42, 229, 236, 370/237, 238, 242, 244, 342, 344, 360, 363, 370/428, 441, 445, 386, 910, 85.3, 455; 709/203, 709/230, 226, 238, 236, 233

(56) References Cited

U.S. PATENT DOCUMENTS

| | | | | |
|---|---|---|---|---|
| 5,696,764 A | * | 12/1997 | Soumiya et al. | 370/395.41 |
| 5,822,540 A | | 10/1998 | Caldara et al. | 395/200.66 |
| 5,828,653 A | | 10/1998 | Goss | 370/230 |
| 5,850,399 A | | 12/1998 | Ganmukhi et al. | 370/412 |
| 5,936,958 A | * | 8/1999 | Soumiya et al. | 370/395.43 |
| 5,938,749 A | * | 8/1999 | Rusu et al. | 710/54 |
| 5,953,335 A | | 9/1999 | Erimli et al. | 370/390 |
| 6,084,856 A | | 7/2000 | Simmons et al. | 370/235 |
| 6,094,435 A | * | 7/2000 | Hoffman et al. | 370/414 |
| 6,134,218 A | * | 10/2000 | Holden | 370/232 |
| 6,141,323 A | * | 10/2000 | Rusu et al. | 370/236 |
| 6,377,548 B1 | * | 4/2002 | Chuah | 370/233 |
| 6,385,638 B1 | * | 5/2002 | Baker-Harvey | 718/107 |
| 6,647,424 B1 | | 11/2003 | Pearson et al. | 709/232 |
| 6,665,872 B1 | * | 12/2003 | Krishnamurthy et al. | 725/95 |
| 6,667,985 B1 | | 12/2003 | Drummond-Murray | 370/415 |
| 6,754,241 B1 | * | 6/2004 | Krishnamurthy et al. | 370/537 |
| 6,760,774 B1 | * | 7/2004 | Soumiya et al. | 709/233 |
| 6,788,697 B1 | | 9/2004 | Aweya et al. | 370/412 |
| 6,798,743 B1 | | 9/2004 | Ma et al. | 370/235 |
| 6,801,501 B1 | * | 10/2004 | Knightly et al. | 370/233 |
| 6,822,940 B1 | | 11/2004 | Zavalkovsky et al. | 370/237 |
| 2001/0007561 A1 | * | 7/2001 | Aznar et al. | 370/409 |
| 2002/0107908 A1 | * | 8/2002 | Dharanikota | 709/203 |
| 2002/0110134 A1 | | 8/2002 | Gracon et al. | 370/412 |

OTHER PUBLICATIONS

U.S. Appl. No. 09/818,621, filed Mar. 28, 2001.
U.S. Appl. No. 09/797,688, filed Mar. 5, 2001.

* cited by examiner

Primary Examiner—Wellington Chin
Assistant Examiner—Jamal A. Fox
(74) Attorney, Agent, or Firm—Harrity & Snyder, LLP

(57) ABSTRACT

A network device that controls the communication of data frames between stations performs an admission control procedure to reduce congestion on the network device. The network device receives data frames from a number of receive ports and reads a portion of a received data frame to determine a priority associated with the received data frame. When admission control is enabled, the network device determines whether to drop the received data frame based on the priority or some other predetermined criteria.

19 Claims, 4 Drawing Sheets

ADMISSION CONTROL IN A NETWORK DEVICE

CROSS-REFERENCE TO RELATED APPLICATIONS

This application is related to the following commonly-assigned, copending applications entitled: METHOD AND APPARATUS FOR REDUCING CONGESTION ON A NETWORK DEVICE, Ser. No. 09/797,688 filed Mar. 5, 2001 and METHOD AND APPARATUS FOR PRIORITY-BASED ADMISSION CONTROL, Ser. No. 09/818,621 filed Mar. 28, 2001.

TECHNICAL FIELD

The present invention relates generally to network communications and, more particularly, to admission control in a network device.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

When all of the stations connected to the network are simultaneously operating and transmitting data at high speeds, data traffic on the switch may become heavy. Accordingly, some switches may drop received data frames when a congestion condition occurs. That is, the switch may stop processing a data frame when one or more resources on the switch associated with processing the data frame cannot perform their intended functions. In this case, the data frame is not forwarded to its intended destination. A drawback with conventional switches that drop data frames when data traffic is heavy is that the data frame often uses a number of the switch's resources before the data frame is ultimately dropped. This often reduces the overall data throughput of the switch.

DISCLOSURE OF THE INVENTION

There exists a need for a mechanism for selectively dropping data frames received by a network device while using a minimal amount of the device's resources.

This and other needs are met by the present invention, where a multiport device receives a data frame and reads a portion of the data frame to identify a priority associated with the data frame. The multiport device then determines whether to initiate admission control based on the availability of resources on the multiport device. When admission control is enabled, the multiport device may drop the data frame and avoid using additional resources processing that data frame.

According to one aspect of the invention, a network device that controls communication of data frames between stations is provided. The network device includes a plurality of receive ports configured to receive data frames from the stations. The network device also includes data frame processing logic that is configured to determine a priority associated with a received data frame and determine whether admission control is enabled. The data frame processing logic is also configured to determine whether to drop the received data frame based on the priority and whether admission control is enabled.

Another aspect of the present invention provides a method in a network device that controls communication of data frames between stations. The method includes receiving data frames from the stations and determining a priority associated with a received data frame. The method also includes determining whether admission control on the network device is enabled. The method further includes determining, based on the priority of the received data frame and whether admission control is enabled, whether to drop the received data frame.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
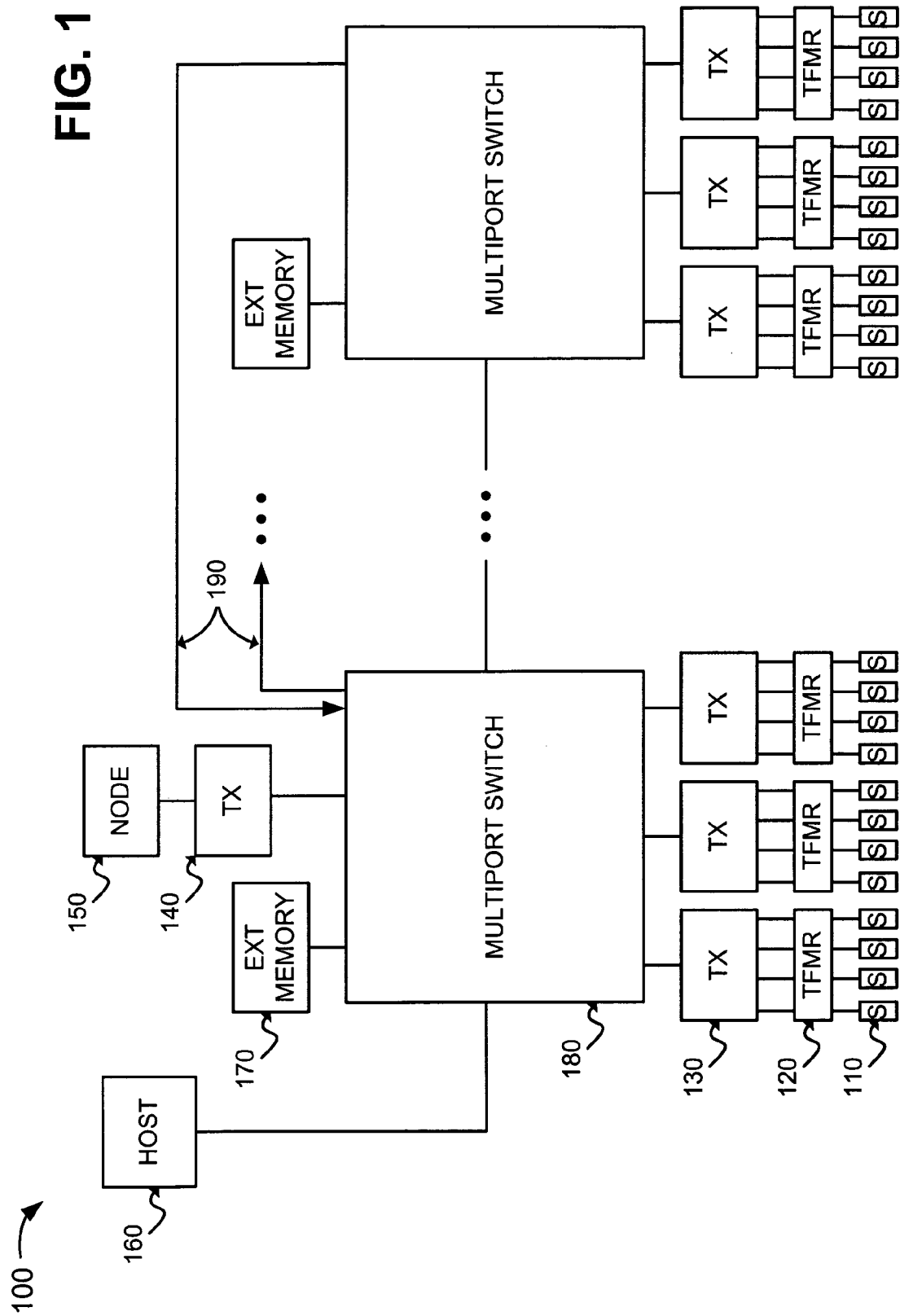
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
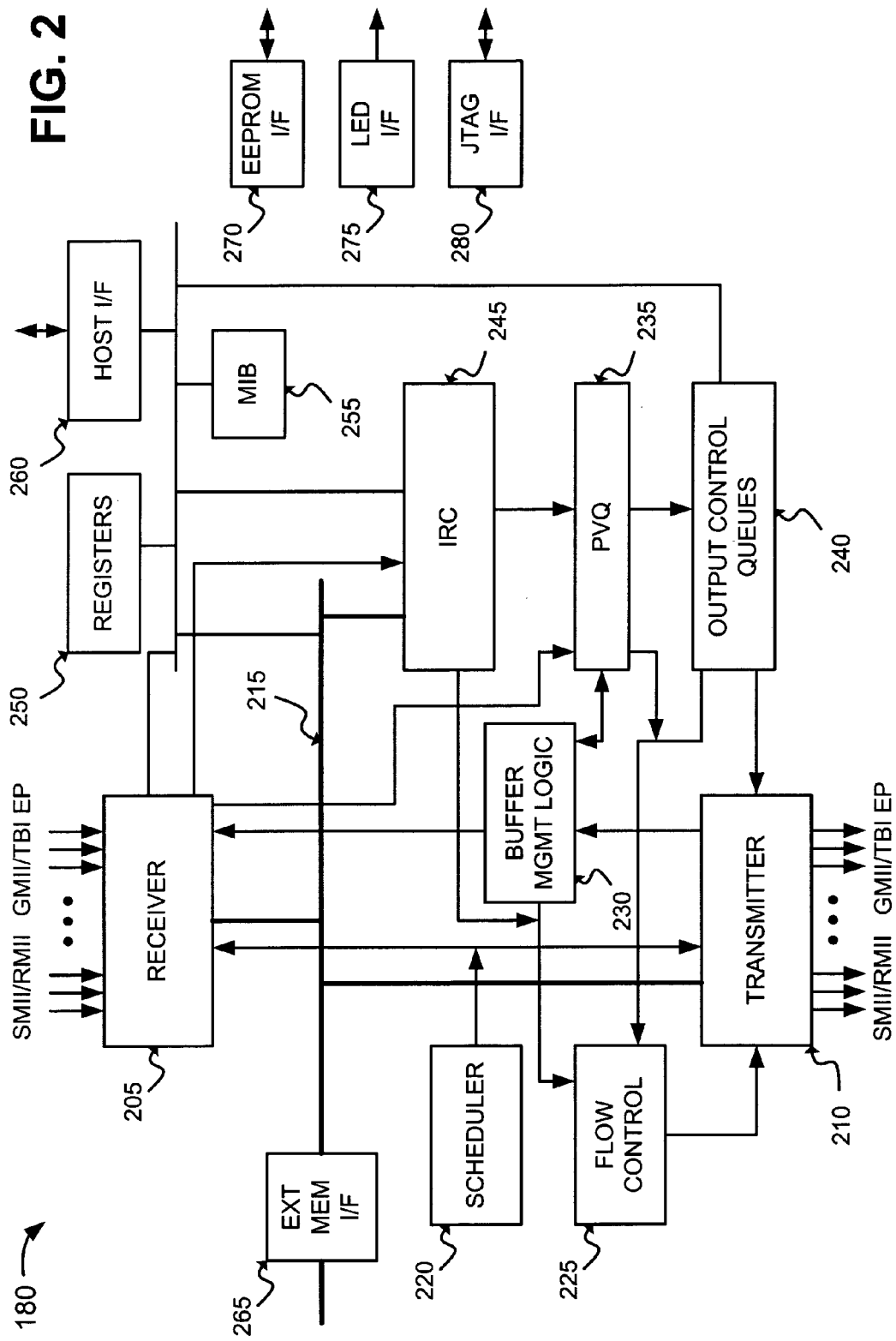
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

The present invention is directed to an admission control mechanism in a network device, such as multiport switch 180. The multiport switch 180, consistent with the present invention, determines when to initiate an admission control procedure based on the availability of switch resources. When admission control is initiated, the multiport switch 180 examines a portion of a received data frame and determines whether to drop the data frame based on predetermined criteria. When the data frame is to be dropped, the multiport switch drops the data frame without using additional switch resources, such as a frame pointer.

Figure 3:
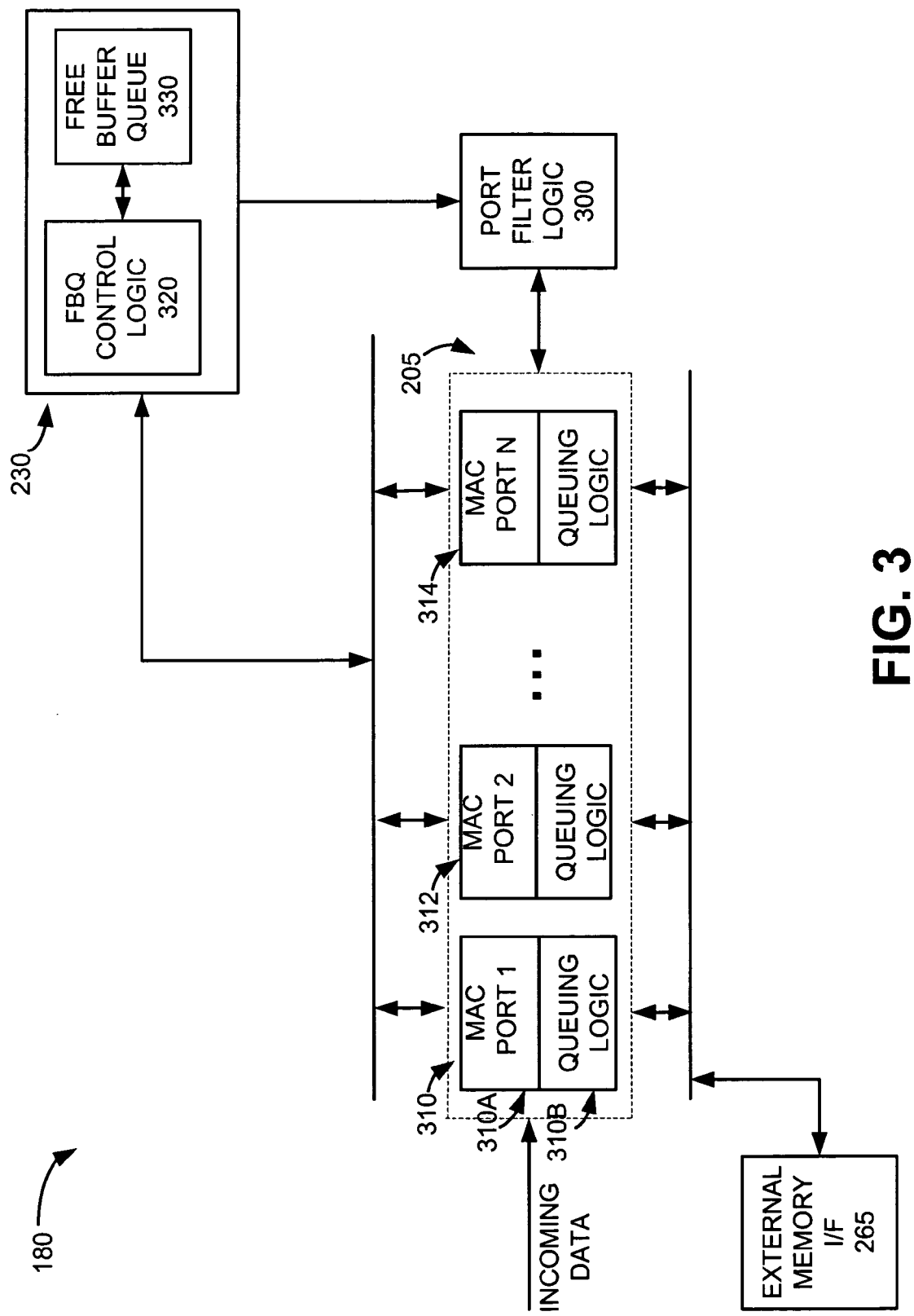
FIG. 3 is an exemplary detailed block diagram of a portion of the multiport switch of FIG. 1, consistent with an implementation of the present invention.

FIG. 3 illustrates a portion of multiport switch 180, consistent with an exemplary implementation of the present invention, in which admission control may be performed. Referring to FIG. 3, multiport switch 180 includes receiver 205, buffer management logic 230, external memory interface 265 and port filter logic 300.

The receiver 205 includes MAC modules labeled 310, 312 and 314 corresponding to ports 1 through N, respectively. Each MAC module may include a receive FIFO buffer and queuing logic. For example, referring to FIG. 3, MAC module 310 includes a receive FIFO buffer, labeled 310A, and queuing logic 310B. The other MAC modules may similarly include receive FIFO buffers and queuing logic.

The buffer management logic 230 includes free buffer queue (FBQ) control logic 320 and free buffer queue 330. The FBQ 330 stores frame pointers that identify locations in external memory 170 that are available to store data frames. The FBQ control logic 320, consistent with the present invention, initiates admission control in multiport switch 180 when the number of available frame pointers in FBQ 330 falls below a predetermined threshold. The particular number of frame pointers left in the FBQ 330 before the FBQ control logic 320 initiates admission control may be set based on the user's requirements and may also be programmable by the user. That is, the user may program the number of frame pointers remaining in FBQ 330 before admission control is initiated, via host interface 260, for example, based on network conditions. Upon initiation of admission control, the FBQ control logic 320 may transmit an admission control signal to port filter logic 300.

The port filter logic 300, consistent with an exemplary implementation of the present invention, determines a priority associated with a received data frame, as described in more detail below. When the port filter logic 300 identifies a data frame as having a predetermined priority and admission control on the multiport switch 180 is enabled, the port filter logic 300 signals the appropriate MAC module to drop the data frame. In this manner, frame pointers will not be used up by data frames of the predetermined priority when admission control is enabled.

Port filter logic 300 is illustrated in FIG. 3 as being a separate component from the receiver 205. It should be understood that in alternative implementations of the present invention, the port filter logic 300 may be part of receiver 205. In another alternative, the functions performed by port filter logic 300 may be performed by another logic component, such as the respective queuing logic of the MAC modules.

In an exemplary implementation of the present invention, the port filter logic 300 categorizes data frames as having either a high priority or a low priority. A high priority frame may include a frame that requires lower access latency, such as a frame destined for a management device or a frame for a multimedia application. A low priority frame may include any other frame. In alternative implementations, the number of priorities associated with the data frames may be greater than two. For example, the port filter logic 300 may identify frames as having one of three levels of priority, such as low, medium and high.

In addition, in some implementations of the present invention, the multiport switch 180 may receive data frames having a priority indication. For example, an Ethernet frame may include a three-bit field representing one of eight levels of priority. In this case, port filter logic 300 may map the received priority information to a corresponding priority level supported by the multiport switch 180. For example, the port filter logic 300 may map the eight levels of priority to either high or low priority on the multiport switch 180. Alternatively, the eight levels of priority associated with received data frames may be mapped to three or more levels of priority on the multiport switch 180.

The external memory interface 265, as described previously, receives data frames from the receive FIFO buffers along with frame pointers. The external memory interface 265 transfers the data frames to external memory 170 (FIG. 1) at the locations identified by the respective frame pointers.

Figure 4:
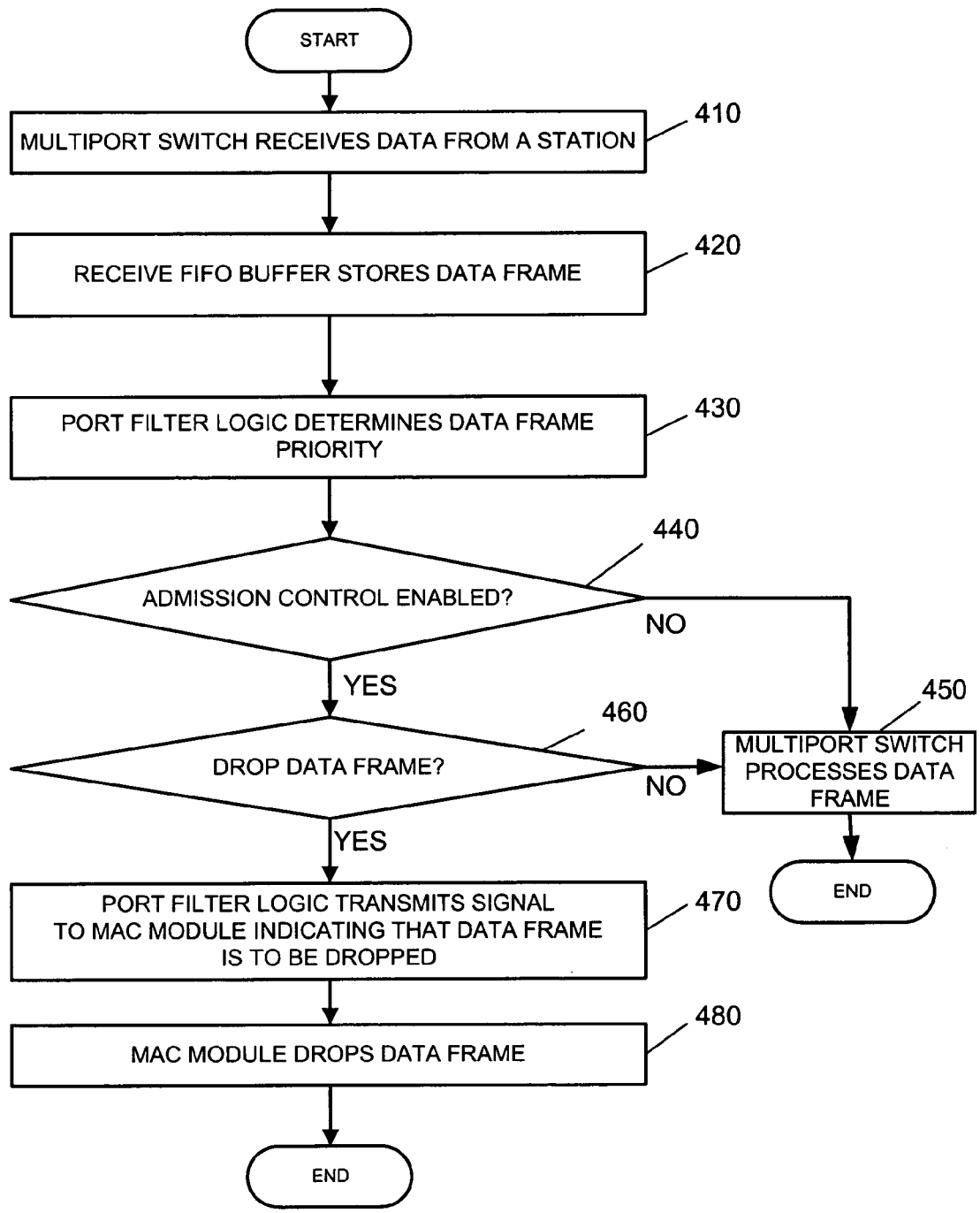
FIG. 4 is a flow diagram illustrating processing performed by the multiport switch of FIG. 1, according to an exemplary implementation consistent with the present invention.

FIG. 4 illustrates exemplary processing by multiport switch 180 in an implementation consistent with the present invention. Processing may begin upon start-up of network 100 (FIG. 1). Assume that a network station 110 transmits a data frame and multiport switch 180 receives the data frame [step 410]. For example, assume that MAC module 310 receives a data frame. In this case, receive FIFO buffer 310A stores the data frame [step 420].

The port filter logic 300 examines a portion of the received data frame and determines the priority associated with the received data frame [step 430]. In an exemplary implementation of the present invention, the port filter logic 300 examines the first 64 bytes of the received data frame as the data frame is being stored in the receive FIFO buffer 310A. In an Ethernet frame, the first 64 bytes of the data frame include the source and destination addresses in addition to a portion of the payload of the data frame. In alternative implementations, the port filter logic 300 may read other numbers of bytes of the data frame to enable the port filter logic 300 to determine a priority associated with the data frame.

As described previously, the port filter logic 300 may identify the priority based on the type of frame or the destination of the frame. For example, a data frame for a multimedia application or a data frame destined for a management device may be designated as a "high" priority frame. All other data frames may be designated as low or normal priority frames. Alternatively, the port filter logic 300 may identify the priority based on any other criteria, such as the particular user's requirements. In another implementation, the port filter logic 300, as described previously, may identify the priority based on priority information transmitted with the data frame. In this situation, the port filter logic 300 may map the received priority information to a corresponding priority level supported by the multiport switch 180.

In any event, after identifying the priority associated with the data frame, port filter logic 300 determines whether admission control is enabled [step 440]. In an exemplary implementation, the port filter logic 300 determines whether admission control is enabled based on whether a signal from FBQ control logic 320 is asserted. For example, assume that FBQ 110 control logic 320 determines that the number of available frame pointers in FBQ 330 is below a predetermined threshold. In this case, FBQ control logic 320 transmits an enable admission control signal (e.g., ENABLE_ADMISSION_CONTROL) to port filter logic 300.

If admission control is not enabled, the multiport switch 180 processes the data frame [step 450]. That is, in the example above, the queuing logic 310B accesses the FBQ 330 to obtain a frame pointer and transfers the data frame stored in receive FIFO buffer 310A and the frame pointer to external memory interface 265. The external memory interface 265 then transfers the data frame to the location in external memory 170 identified by the frame pointer. The multiport switch 180 then processes the data frame to generate frame forwarding information, retrieves the data frame from external memory 170 and forwards the data frame to its intended destination(s).

If the port filter logic 300 determines that admission control is enabled, the port filter logic 300 determines whether the data frame is to be dropped [step 460]. In an exemplary implementation of the present invention, the port filter logic 300 determines whether the data frame is to be dropped based on the priority of the data frame. For example, in an exemplary implementation, when port filter logic 300 identifies a data frame as having a "low" priority and admission control is enabled, the port filter logic 300 determines that the data frame is to be dropped. In alternative implementations, the port filter logic 300 may determine that data frames of other priorities are to be dropped when admission control is enabled, based on the user's requirements. For example, the port filter logic 300 may decide to drop low priority and medium (i.e., normal) priority data frames when admission control is enabled. Alternatively, the port filter logic 300 may decide to drop data frames destined for a particular port or frames transmitted from a particular port. In summary, the port filter logic 300 may decide to drop data frames when admission control is enabled based on the particular user's requirements.

In an exemplary implementation consistent with the present invention, if the port filter logic 300 decides to drop the data frame, the port filter logic 300 transmits a signal to the corresponding MAC module that received the data frame [step 470]. In the example above, the port filter logic 300 transmits a signal to MAC module 310 indicating that the data frame is to be dropped. In an exemplary implementation, the port filter logic 300 may transmit a signal to the MAC module indicating that the data frame is a "runt" (i.e., not a complete data frame or the data frame contains an error), even though the data frame is not actually a runt. In this situation, the MAC module may be configured to recognize that a runt frame is to be dropped. This advantageously simplifies the logic of the MAC modules since the MAC module may already be configured to drop frames identified as runts. Alternatively, the port filter logic 300 may transmit any other signal (e.g., DROP_FRAME) indicating that the data frame is to be dropped.

In any event, the MAC module 310 receives the signal from the port filter logic 300 and drops the data frame [step 480]. In this case, the queuing logic 310B deletes the data frame from the receive FIFO buffer 310A. Advantageously, the data frame is dropped at the "front end" of the multiport switch 180 (i.e., early in the processing) without using a significant amount of resources of the multiport switch 180. For example, the queuing logic 310B does not obtain a frame pointer from FBQ 330 and does not forward the data frame to external memory interface 265. This saves considerable processing time associated with obtaining a frame pointer and then returning the frame pointer to the FBQ 330. In other words, the multiport switch 180 stops all processing related to forwarding that particular data frame to its intended destination.

Described has been an apparatus and method for performing admission control in a network device. One advantage of the present invention is that the multiport switch 180 can selectively drop data frames having a certain priority when admission control is enabled. Another advantage of the present invention is that the multiport switch 180 is able to determine whether to drop a received data frame relatively early in the processing of the data frame. This enables the multiport switch to avoid using resources for a data frame that will later be dropped, thereby increasing overall data throughput.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described mainly in relation to dropping data frames based on a priority indicator. The present invention may also be used in situations where other criteria may be used to determine whether to drop data frames.

What is claimed is:

1. A network device configured to control communication of data frames between stations, comprising:
   a plurality of receive ports configured to receive data frames from the stations;
   a buffer configured to store address pointers corresponding to locations in an external memory available for storing data frames;
   buffer control logic configured to:
      detect when a number of address pointers in the buffer reaches a threshold, and
      transmit a signal to the data frame processing logic indicating that admission control is enabled when the threshold is detected; and
   data frame processing logic configured to:
      determine a priority associated with a received data frame,
      determine whether admission control is enabled, and
      determine whether to drop the received data frame based on the priority and whether admission control is enabled.

2. The network device of claim 1, wherein when the determined priority is at least one of low or normal priority and admission control is enabled, the data frame processing logic is further configured to:
   drop the data frame without obtaining an address pointer for the data frame.

3. The network device of claim 1, further comprising:
   a plurality of receive buffers corresponding to the plurality of receive ports, the plurality of receive buffers configured to store the received data frames, wherein the data frame processing logic is further configured to:
      generate a signal indicating that a received data frame is to be dropped, and
      delete the data frame from a first one of the plurality of receive buffers where the data frame is stored.

4. The network device of claim 3, wherein the signal indicates that the received data frame is a runt.

5. The network device of claim 1, wherein the data frame processing logic is further configured to:
   determine whether to drop the data frame based on the destination address of the data frame.

6. The network device of claim 1, wherein when determining the priority associated with the received data frame, the data frame processing logic is configured to:
   read a portion of the received data frame to identify the priority.

7. In a network device that controls communication of data frames between stations, a method comprising:
   receiving data frames from the stations;
   determining a priority associated with a received data frame;
   detecting a condition on the network device, the condition being associated with an amount of space available in an external memory for storing the received data frames;
   enabling admission control on the network device when the condition is detected; and
   determining, based on the priority of the received data frame and whether admission control is enabled, whether to drop the received data frame.

8. The method of claim 7, wherein the detecting a condition comprises detecting when a number of pointers corresponding to locations in the external memory for storing the received data frames reaches a threshold, and when the determined priority is at least one of low or normal priority and admission control is enabled, the method further comprises:

dropping the data frame without obtaining a pointer.

9. The method of claim 8, wherein the dropping the data frame includes:

discarding the data frame before the data frame is transferred to the external memory.

10. The method of claim 7, wherein the detecting a condition comprises:

detecting when a number of address pointers reaches a threshold, the address pointers corresponding to locations in the external memory for storing the received data frames.

11. The method of claim 7, further comprising:

storing the received data frames in at least one buffer;

generating a signal indicating that a received data frame is to be dropped based on the priority of the received data frame; and transmitting a signal to a buffer storing the received data frame, the signal indicating that the data frame is to be dropped.

12. The method of claim 7, wherein the determining a priority associated with the received data frame includes:

reading a portion of the data frame; and generating a priority indication based on the portion of the data frame.

13. The method of claim 7, wherein the determining a priority associated with the received data frame includes:

mapping a priority indicator received with the data frame to one of a number of priority levels supported by the network device.

14. A network device configured to control communication of data frames in a network, comprising:

a plurality of receive ports configured to receive data frames;

a buffer configured to store pointers corresponding to locations in an external memory available for storing data frames; and processing logic configured to:

detect when a number of pointers in the buffer reaches a threshold, initiate admission control when the number of pointers reaches the threshold, identify a priority associated with a received data frame, and determine, based on the priority of the received data frame, whether to drop the received data frame.

15. The network device of claim 14, wherein the processing logic is further configured to:

drop the data frame when the identified priority is at least one of low or normal priority.

16. The network device of claim 15, wherein when dropping the data frame, the processing logic is configured to:

delete the data frame from a memory on the network device and stop processing related to forwarding the dropped data frame to its intended destination.

17. The network device of claim 14, further comprising:

at least one memory configured to store received data frames, wherein the processing logic is further configured to:

delete the received data frame from the at least one memory when the data frame processing logic determines that the receive data frame is to be dropped.

18. The network device of claim 14, wherein when identifying a priority associated with the received data frame, the processing logic is configured to:

read a portion of the received data frame to identify the priority of the received data frame.

19. The network device of claim 18, wherein the portion comprises 64 bytes.

* * * * *